United States Patent [19]

Quirke

[11] 4,011,552
[45] Mar. 8, 1977

[54] TEMPERATURE SENSOR THAT IS NON-RESPONSIVE TO TRANSIENT CONDITIONS

[75] Inventor: Patric C. Quirke, Whitewater, Wis.

[73] Assignee: Whitewater Electronics, Inc., Whitewater, Wis.

[22] Filed: Jan. 7, 1976

[21] Appl. No.: 646,995

[52] U.S. Cl. .................. 340/228 R; 340/227 R; 73/1 F
[51] Int. Cl.² ......................... G08B 21/00
[58] Field of Search ........ 340/227 R, 227.1, 228 R; 73/1 F; 324/65 R, 71 R

[56] References Cited
UNITED STATES PATENTS 3,499,310    3/1970    Hundere et al. ............... 73/1 F
3,753,256    8/1973    McDonald .................. 340/227.1

*Primary Examiner*—John W. Caldwell
*Assistant Examiner*—William M. Wannisky
*Attorney, Agent, or Firm*—Iran Milton Jones & Associates

[57] ABSTRACT

A temperature sensor for a food freezer alarm or the like comprises a sensing element such as a thermistor enclosed in a capsule filled with a material (e.g., water-alcohol mixture) that melts and freezes at a predetermined temperature (e.g., 25° F.), with such change of state occurring as a result of change of latent heat content of the material.

4 Claims, 1 Drawing Figure

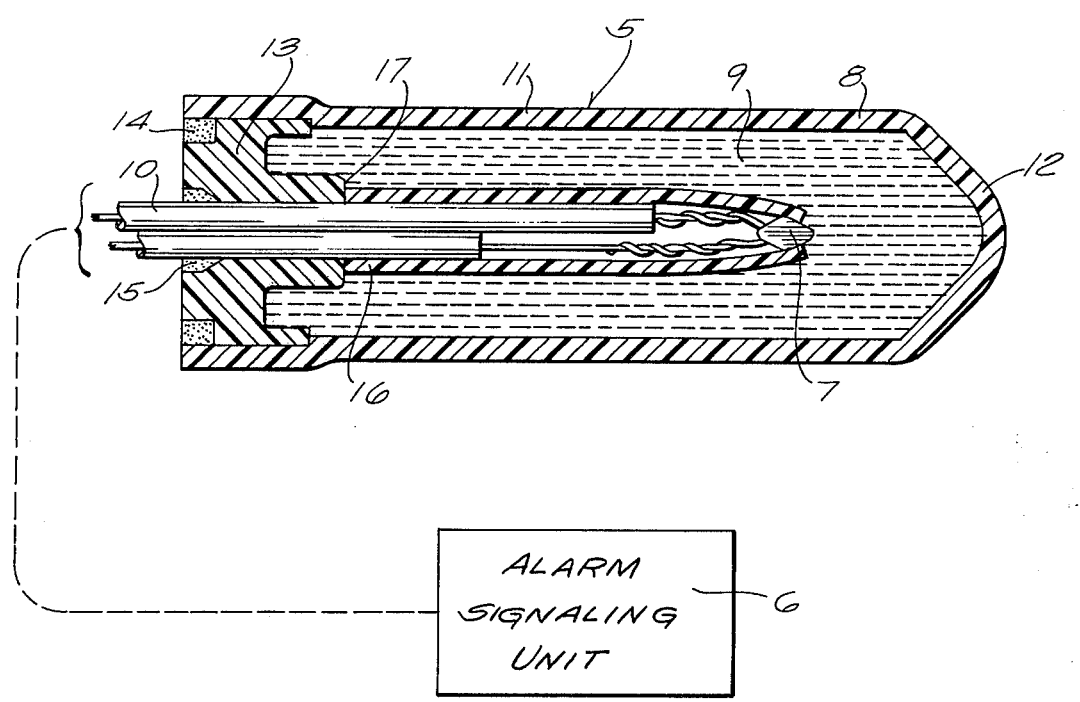

TEMPERATURE SENSOR THAT IS NON-RESPONSIVE TO TRANSIENT CONDITIONS

This invention relates to temperature responsive sensors and is more particularly concerned with a temperature responsive device that produces an output when a temperature to be monitored departs in one sense from a predetermined value, but only if such a departure persists for a long enough time to be significant.

An alarm device for signalling the inoperativeness of a food freezer represents a typical application for a temperature sensor of the present invention. The sensor is located in the interior of the freezer cabinet and is connected with an output device that can produce a visible or audible alarm. If for any reason the refrigeration mechanism of the freezer stops operating, the sensor responds to rise of the freezer temperature to above a predetermined critical value and causes an alarm to issue. The critical temperature is usually selected to be in the neighborhood of 25° F., which is substantially higher than the normally prevailing temperature in a freezer cabinet but lower than the temperature at which frozen foods begin to defrost.

The rather widespread use of freezer alarms has revealed one deficiency in those that have heretofore been available. Many home freezers have an automatic defrosting cycle that occurs at regular intervals, such as once every day or two. During automatic defrosting, the refrigeration mechanism is turned off and a heater is turned on to heat the inner cabinet walls and defrost them. When the wall temperature reaches a predetermined value — typically, 50° to 55° F. — a thermostatic control causes the heater to be turned off and the blower and compressor to be turned back on. For about 15 minutes after the heater is turned off, air blown across the interior surfaces of the cabinet walls is heated to above the critical 25° temperature of the alarm sensor. Even though such heated air cannot effect any material thawing of the freezer contents, the prior alarm unit sensor often responded to it and caused an alarm signal to be emitted at the very time that the refrigeration mechanism was in normal operation. Similarly, the alarm sensor heretofore commonly used tended to cause issuance of an alarm at times when the freezer cabinet door was necessarily kept open for a few minutes during a search for a frozen food package that was deep in the interior of the cabinet.

Inasmuch as the signal emitted by a freezer alarm is usually a loud, rather high-pitched monotone that is audible in all portions of a large house, such spurious alarm signals were annoying as well as confusing.

It is evident that a thermistor or similar temperature responsive sensing element that is directly exposed to the air in a freezer cabinet will rather quickly come to the temperature of the air around it and will respond accordingly. The obvious expedient for delaying the response of a freezer alarm sensing element to an increase in its ambient temperature is to swaddle it in heat insulating material. However, experiments have shown that heat insulation either affords too brief a delay period or else makes for a bulky sensor with a more or less unpredictably delayed response.

With the foregoing considerations in mind, it is the general object of the present invention to provide a compact temperature responsive sensor or probe that produces an output when a temperature to be monitored departs in one sense from a predetermined value, but which produces that output only if such departure persists for a long enough period of time to be significant, and not in response to such a departure that is of sufficiently short duration to be inconsequential.

It is another general object of this invention to provide a sensing device that can be employed to produce an output when a temperature to be monitored rises above a predetermined value and stays above that value for a significant time, and which can also be used to produce an output when a monitored temperature remains below that same critical value for a significant time.

Another and more specific object of the invention is to provide a temperature responsive sensing device which responds with a substantially predictable delay interval when the temperature of a monitored medium departs in one sense from a predetermined value, and wherein said delay interval is a function of the heat content of the monitored medium rather than merely of time.

A further object of this invention is to provide a delayed-response temperature sensing device of the character described, having a critical temperature value and a delay factor that can be very readily predetermined.

It is also a specific object of this invention to provide a compact and inexpensive temperature sensor or probe that is particularly adapted for monitoring the temperature in a freezer cabinet or the like and is connectable with an alarm unit, said sensor being non-responsive to transient rises in temperature such as are due to an automatic defrosting cycle but being cooperable with the alarm unit to issue a perceptible warning signal when the temperature in the cabinet remains above a predetermined level for a significant period of time.

With these observations and objectives in mind, the manner in which the invention achieves its purpose will be appreciated from the following description and the accompanying drawing, which exemplify the invention, it being understood that changes may be made in the specific apparatus disclosed herein without departing from the essentials of the invention set forth in the appended claims.

The accompanying drawing illustrates one complete example of an embodiment of the invention constructed according to the best mode so far devised for the practical application of the principles thereof, and is a view in longitudinal section of a sensor device embodying the principles of this invention.

Referring now to the accompanying drawing, the numeral 5 designates generally a temperature responsive sensor or probe embodying the principles of this invention, shown connected with an output device 6 that is illustrated as an alarm signalling unit. The probe 5, which is adapted to be housed in the interior of a food freezer cabinet (not shown) or the like, comprises, in general, a temperature responsive sensing element 7 that is enclosed in a sealed capsule 8, and a body of material 9 which surrounds the sensing element and substantially fills the capsule.

The connection between the alarm signalling unit 6 and the sensing element 7 of the sensor 5 comprises a two-conductor cable 10 that extends through a wall of the capsule in sealed relation thereto. The sensing element 7 can comprise a thermistor, that is, a resistor having a resistance that varies in correspondence with its temperature. The end portions of the cable conductors that are within the capsule are connected with the terminals of the thermistor; hence, the resistance of a circuit comprising the conductor pair depends upon the temperature of the sensing element.

The alarm signalling unit 6 can be one of several known devices for producing a readily perceptible signal or other output in response to the sensing of an abnormal condition. While the alarm unit might present a flashing light or other visible signal, it is usually one that emits a rather penetrating audible tone so that its warning is perceptible all through a house or other building. As examples of alarm units satisfactory for cooperation with a sensor embodying the principles of this invention, reference can be made to U.S. Pat. No. 3,331,970 to Dundon et al. and to the applicant's copending application, Ser. No. 560,487, filed Mar. 20, 1975. Such an output device can comprise circuitry (which is well known and therefore is not illustrated on the accompanying drawing) that causes the device to produce its output when the resistance of its associated sensor passes a predetermined value. Obviously, varying values of the resistance of the sensing element 7 are but one type of input to which an alarm unit 6 can be responsive. Depending upon the circuitry of the particular alarm unit, other types of inputs, obtained from other types of temperature responsive elements, can be employed for initiating operation of the alarm unit when conditions become appropriate for issuance of a alarm. Hence the sensing element 7 is herein described as a thermistor merely for purposes of example.

Turning now to a more specific consideration of the sensor 5, its capsule comprises, as shown, a generally cylindrical hollow body 11 which can be molded of plastic material (e.g., nylon) to have a more or less conical wall portion 12 at one end thereof formed integrally with the cylindrical main portion of the body. Its other end wall can comprise a plug or cap 13 that has a sealing connection 14 with the cylindrical portion of the body. The cable 10 extends concentrically through the plug 13 and is sealed thereto, as at 15, so that the capsule, when assembled, can hold liquid without leakage.

The interior of the capsule should be large enough so that the sensing element 7 can be supported therein in substantially spaced relation to all wall portions of the capsule, to be substantially surrounded by the material 9 which fills the capsule.

The sensing element 7 is held in spaced relation to the capsule walls by supporting means 16, shown as comprising a length of heat shrunken plastic tubing that snugly embraces the sensing element 7 and all of those portions of the cable that are inward of the plug-like end wall 13. One end of the heat shrunken tubing edgewise abuts a flat surface on the end wall 13, as at 17. Although not absolutely inflexible, the tubing is nevertheless stiff enough to be able to cooperate with that end wall and the cable in holding the sensing element substantially on the axis of the capsule.

The material 9 that fills the capsule is one which freezes and melts at substantially the temperature that is critical for response of the sensing device and which undergoes such change of state in consequence of a change in its latent heat content. Thus, if the probe 5 is intended to initate operation of an alarm device when the monitored temperature exceeds 25° F. for a significant period of time, the material 9 should be one that freezes and melts at a temperature of about 25° F.

As is well known, a crystalline solid cannot be brought to its molten state unless, after sufficient heat has been added to it to bring it up to its melting temperature, a certain amount of additional heat is added to it to convert it to a liquid at the same temperature. The same amount of heat must be removed from the material to convert it from a liquid at its freezing temperature to a solid at the same temperature. The amount of heat that must be added to or withdrawn from a material to effect a change in its state without changing its sensible temperature is of course known as latent heat.

Certain materials undergo an amorphous solidification and fusion, becoming more and more viscous as temperature falls, ultimately attaining the characteristics of a solid without any definite freezing point or latent heat. Such materials are not suitable for the sensor device of the present invention, inasmuch as such a material filling the capsule would function essentially as a heat insulation.

There are also materials which partake of both crystalline and amorphous fusion and solidification characteristics, as for example olive oil. Such materials are suitable for filling the capsule, provided their crystalline characteristics are sufficiently marked so that they can be regarded as being substantially crystalline when in the solid state, as is the case with olive oil.

In the case of a sensor intended for installation in a food freezer, it is practically essential that the material which fills the capsule be one that is non-toxic; and, in fact, it is desirable in all cases that the material be non-toxic, having in mind not only the possibility that the contents of the capsule may be ingested by a child but also the necessity for handling the material when the capsule is filled during manufacture of the sensor. Fortunately, there are many substances which are both non-toxic and possessed of the necessary melting and fusion characteristics and which, moreover, can be adjusted with a minimum of experimentation to a liquid-solid conversion temperature value that corresponds to a desired critical temperature for the sensor.

Olive oil, mentioned above, fuses and solidifies at about 25° F. and is thus fairly well suited for filling the sensor capsule. However, because of its partially amorphous character, its liquid-solid conversion temperature is not a definitely fixed one; and, moreover, its temperature response characteristics are not invariable from batch to batch. Other materials are therefore better suited for the purpose.

An aqueous solution of ethyl alcohol (pure grain alcohol) is a preferred material. Such alcohol, in the quantities here involved, is nontoxic and is readily miscible with water. Alcohols, in themselves, have amorphous change of state characteristics but do not materially affect the crystalline characteristics of water in which they are mixed. The freezing temperature of water is lowered in proportion to the amount of alcohol mixed with it, but the latent heat of fusion and freezing of the mixture is that of its water content. Hence when a water-alcohol mixture is used as the material 9, the critical temperature of the material can be readily controlled on a repeatable basis. If the sensing element is a thermistor, distilled water is preferably used in the mixture so that dissolved impurities in the water will not affect the resistance characteristics of the thermistor.

Where the critical temperature of the sensing device is intended to be below 32° F., but not very greatly lower than that value, other aqueous solutions are also suitable for filling the capsule. By way of example, these can be aqueous solutions of the edible salts (such as table salt or calcium chloride) or sugar solutions. Especially if the sensor is a thermistor, the dissolved material in such a solution should be one that does not affect the resistance or other significant characteristics of the resistor.

While there must be enough of the material 9 in the capsule so that the sensing element is completely surrounded by it, the volume of such material need not be large in absolute terms. This is apparent from the fact that the amount of heat which must be added to ice at 32° F. to convert it to water at the same termperature would be sufficient to raise the sensible temperature of the same quantity of water from 32° F. to about 112° F. It follows that even a relatively small volume of the material 9 will account for a substantial delay in response of the sensing device. It will also be apparent that the delay interval can be controlled both by the latent heat characteristic of the particular material selected for filling the capsule and by the volume of such material with which the capsule is filled.

It is noteworthy that the delay in response of the sensing device of this invention is not so much a function of time as of the amount of heat being added to or drawn from the medium that is being monitored as to temperature. This is to say that if the temperature in a freezer cabinet rises rather rapidly, a probe of this invention will produce a responsive output earlier in time than with a more gradual temperature rise. Such response characteristics are of course desirable in a sensing device that is intended to give warning of abnormal conditions.

It will be apparent that a sensing device embodying the principles of this invention can be made responsive to a persisting in either sense from a predetermined temperature value, that is, to the persistence of either a higher temperature or a lower temperature than the predetermined critical one. In most cases the critical value for the sensing element 7 will be determined by the circuitry of the alarm unit or other output device with which the sensing element is connected. Thus, if the sensing element is a thermistor, and the alarm unit comprises an audio frequency oscillator, the thermistor may be so connected in a bias circuit of the oscillator that oscillation begins when the resistance of the thermistor passes a critical value corresponding to the critical temperature. It will be seen that with appropriate changes in circuitry of its associated output device, a probe that can be used to produce an alarm when temperature in a freezer cabinet persists at a value of above, e.g., 25° F., could also be used to produce a frost warning alarm when a monitored temperature remained below that same value for a significant time interval.

From the foregoing description taken with the accompanying drawing, it will be apparent that this invention provides a temperature responsive sensor which is particularly well adapted for temperature alarm systems and which is non-responsive to transient abnormalities of a temperature being monitored by the sensor.

Those skilled in the art will appreciate that the invention can be embodied in forms other than as herein disclosed for purposes of illustration.

The invention is defined by the following claims:

I claim:

1. A temperature responsive sensor adapted for installation in a cabinet of a food freezer and cooperable with an output device for producing a perceptible alarm signifying a malfunction of the food freezer, said sensor being non-responsive to short term rises of temperature in the cabinet to above a predetermined value, such as occur during automatic defrosting of the cabinet, but being capable of causing the output device to produce its alarm when temperature in the cabinet remains above said value for a significantly long time, said sensor comprising:
   A. a pair of conductor wires, each having one end connectable with said output device;
   B. a temperature responsive element connected with the other end of each of said conductor wires, said element being cooperable with said conductor wires and said output device to initiate production of an alarm when the temperature of said element rises above said value;
   C. means defining a capsule having a interior substantially larger than said element, said means comprising
      1. a elongated hollow body that is closed at one end thereof, and
      2. a cap sealing the other end of said hollow body and having an interior surface substantially normal to the axis of the body, said conductor wires extending through said cap in sealing relation thereto and substantially along said axis;
   D. a length of heat shrunken plastic tubing snugly surrounding said element and the portions of the conductor wires that are inward of the cap, one end of said length of tubing edgewise abutting said surface on the cap so that said length of tubing cooperates with the cap and the conductor wires to maintain said element and said portions of the conductor wires in substantially concentric relation to said hollow body and hold said element spaced from said one end thereof; and
   E. a quantity of non-toxic material substantially filling the interior of the capsule, said material being one that passes from a solid state to a liquid state at a temperature substantially equal to said predetermined value and upon the addition of latent heat of fusion thereto, so that when said material is in its solid state the temperature of said element cannot rise above said value until a substantial amount of heat has been added to said material.

2. The sensor of claim 1 wherein said material is water having in solution therein a substance which lowers its freezing temperature and which is selected from the class consisting of edible salts, sugars and alcohols.

3. The sensor of claim 1 wherein said material is selected from the group consisting of olive oil and aqueous solutions of edible salts, sugars and alcohols.

4. A temperature responsive sensor adapted for installation in a cabinet of a food freezer and cooperable with an output device for producing a perceptible alarm signifying a malfunction of the food freezer, said sensor being non-responsive to short term rises of temperature in the cabinet to above a predetermined value, such as occur during automatic defrosting of the cabinet, but being capable of causing the output device to produce its alarm when temperature in the cabinet remains above said value for a significantly long time, said sensor comprising:

A. a pair of conductor wires, each having one end connectible with said output device;

B. a temperature responsive element connected with the other end of each of said conductor wires, said element being cooperable with said conductor wires and said output device to initiate production of an alarm when the temperature of said element rises above said value;

C. means defining a capsule having an interior substantially larger than said element, said means comprising
  1. an elongated hollow body that is closed at one end thereof, and
  2. a cap sealing the other end of said body, said conductor wires extending substantially coaxially through said cap in sealing relation thereto;

D. an elongated substantially tubular plastic member substantially enclosing said element and the portions of the wires that are inward of the cap,
  1. said plastic member having an outside diameter substantially smaller than the inside diameter of the hollow body, and
  2. said plastic member cooperating with the cap to be maintained in substantially concentric relation to the hollow body and spaced from said one end thereof, and itself maintaining said portions of the wires and said element in substantially concentric relation to the hollow body and spaced from said one end thereof; and E. a quantity of non-toxic material substantially filling the interior of the capsule and thus surrounding the plastic member all along the length thereof and extending between said one end of the hollow body and its adjacent end of the plastic member, said material being one that passes from a solid state to a liquid state at a temperature substantially equal to said predetermined value and upon the addition of latent heat of fusion thereto, so that when said material is in its solid state the temperature of said element cannot rise above said value until a substantial amount of heat has been added to said material.

* * * * *